(12) United States Patent
Unru et al.

(10) Patent No.: US 12,199,440 B2
(45) Date of Patent: Jan. 14, 2025

(54) 3-PHASE PV INVERTER WITH 2-PHASE ISOLATED OPERATION IN THE EVENT OF A NETWORK FAULT

(71) Applicant: SMA Solar Technology AG, Niestetal (DE)

(72) Inventors: Alexander Unru, Baunatal (DE); Burkard Müller, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 65 days.

(21) Appl. No.: 17/985,243

(22) Filed: Nov. 11, 2022

(65) Prior Publication Data

US 2023/0070123 A1 Mar. 9, 2023

Related U.S. Application Data

(63) Continuation of application No. PCT/EP2021/062340, filed on May 10, 2021.

(30) Foreign Application Priority Data

May 11, 2020 (DE) ...................... 10 2020 112 723.5

(51) Int. Cl.
*H02M 1/32* (2007.01)
*H02J 3/38* (2006.01)
(Continued)

(52) U.S. Cl.
CPC ........... *H02J 3/388* (2020.01); *H02M 1/0009* (2021.05); *H02M 1/325* (2021.05); *H02M 7/487* (2013.01);
(Continued)

(58) Field of Classification Search
None
See application file for complete search history.

(56) References Cited

U.S. PATENT DOCUMENTS 9,225,262 B2 * 12/2015 Aaltio .................. H02H 7/1227
10,461,664 B1 * 10/2019 Luger ..................... H02J 3/381
(Continued)

FOREIGN PATENT DOCUMENTS

| DE | 102014104216 B3 | 6/2015 |
| DE | 102017131042 A1 | 6/2019 |
| EP | 3252937 A1 | 12/2017 |

OTHER PUBLICATIONS

International Search Report dated Jul. 21, 2021 in connection with PCT/EP2021/062340.

*Primary Examiner* — Thomas J. Hiltunen
(74) *Attorney, Agent, or Firm* — Eschweiler & Potashnik, LLC

(57) ABSTRACT

The disclosure relates to an inverter including a first bridge branch with a first phase output, a second bridge branch with a second phase output, a third bridge branch with a third phase output, wherein the phase outputs of the bridge branches can each be connected to a phase conductor of a three-phase power distribution network. The inverter is configured, in a normal operating mode of the three-phase power distribution network and/or of a higher-level power supply network connected thereto, to connect the phase outputs to the relevant phase conductor and, in the event of a fault in the three-phase power distribution network and/or in the higher-level power supply network connected thereto, to disconnect the three-phase power distribution network from the higher-level power supply network via a network disconnector, to disconnect the first phase output from the first phase conductor by means of a switching unit and to connect same to a neutral conductor of the three-phase power distribution network, and to establish a neutral potential for the neutral conductor via the first bridge branch. The disclosure further relates to a method for operating an inverter of this kind.

16 Claims, 3 Drawing Sheets

(51) Int. Cl.
*H02M 1/00* (2006.01)
*H02M 7/487* (2007.01)
*H02M 7/5387* (2007.01)

(52) U.S. Cl.
CPC ..... *H02M 7/53871* (2013.01); *H02J 2300/24* (2020.01)

(56) References Cited

U.S. PATENT DOCUMENTS

| | | | |
|---|---|---|---|
| 11,014,602 B2* | 5/2021 | Wada | H02M 7/5387 |
| 11,081,997 B2* | 8/2021 | Ohashi | H02P 27/08 |
| 11,303,132 B2 | 4/2022 | Falk | |
| 11,621,650 B2* | 4/2023 | Stickelmann | H02M 7/483 363/56.03 |
| 11,811,338 B2* | 11/2023 | Suzuki | H02P 27/06 |
| 2015/0280607 A1 | 10/2015 | Wachenfeld et al. | |
| 2024/0088813 A1* | 3/2024 | Nishimura | H02K 11/02 |

* cited by examiner

3-PHASE PV INVERTER WITH 2-PHASE ISOLATED OPERATION IN THE EVENT OF A NETWORK FAULT

CROSS REFERENCE TO RELATED APPLICATIONS

This application is a continuation of International Patent Application Number PCT/EP2021/062340, filed on May 10, 2021, which claims priority to German Patent Application number 10 2020 112 723.5, filed on May 11, 2020, and is hereby incorporated by reference in its entirety.

FIELD

The disclosure relates to an inverter having three bridge branches with each having a phase output, wherein the three phase outputs can in each case be connected to a phase conductor of a three-phase network. The disclosure furthermore relates to a method for operating such an inverter.

BACKGROUND

Inverters are often used to convert DC voltage, for example from a photovoltaic (PV) system, into a network-compliant alternating current for feeding into a three-phase AC network. Power supply networks are normally designed to be three-phase at all voltage levels, wherein the voltage curve at the different phases is shifted in each case by 120° in relation to a voltage curve at one of the other phases.

From document DE 10 2014 104 216 B3, a three-phase inverter is known which can be operated in a single-phase emergency operating mode in the event of a failure of the power supply network. In this emergency operating mode, two of the three bridge branches are operated such that between these two bridge branches a single-phase bridge current for emergency power supply, for example of a residential house, can flow on at least one phase conductor. The third bridge branch remains unused.

In the case of a conversion of direct current, power is very uniformly extracted from the direct current source in the normal operating mode of a three-phase inverter, due to the symmetrical phase shift, of 120° each, of the phases with respect to one another. A direct current intermediate circuit which is connected upstream of the bridge branches may therefore have a relatively small capacitance of its intermediate circuit capacitors in a three-phase inverter, with respect to the power transmitted by the inverter. If only one single-phase alternating current is provided via two of the bridge branches, this will load the intermediate circuit capacitors considerably more heavily, which leads to pronounced periodic voltage fluctuations at twice the network frequency, also referred to as "low-frequency ripples." These load the intermediate circuit capacitors heavily and lead to faster aging of the capacitors.

According to publication DE 10 2017 131 042 A1, two of three bridge branches of an inverter are used for converting a direct current into a single-phase alternating current, and the third bridge branch is used in order to exchange power between the direct current source and an energy store, for example, a battery storage. Via suitable control of the third bridge branch, the alternating load of the DC intermediate circuit may be compensated via a periodically occurring power exchange between the direct current intermediate circuit and the energy store, which leads to a voltage smoothing in the intermediate circuit.

SUMMARY

The present disclosure is directed to an inverter that is three-phase in the normal operating mode such that, in an emergency power operating mode, an emergency power supply of at least parts of the three-phase network with optimally low voltage fluctuations in the intermediate circuit is enabled without using an additional energy store to compensate for the load on the intermediate circuit.

An inverter of the aforementioned type according to the disclosure is configured to connect the phase outputs to the respective phase conductor in a normal operating mode of the three-phase power distribution network and/or of a higher-level power supply network connected to the power distribution network.

The inverter is furthermore configured, in the case of a fault in the three-phase power distribution network and/or in the higher-level power supply network connected thereto, to disconnect the three-phase power distribution network from the higher-level power supply network using a network disconnector, to disconnect the first phase output from the first phase conductor via a switching unit and to connect it to a neutral conductor of the three-phase power distribution network, to establish a neutral potential for the neutral conductor via the first bridge branch, and to control the second bridge branch and the third bridge branch after the network disconnection in such a way that voltages between the second and third phase output and the neutral conductor in each case have a different phase position in relation to one another. The bridge branches may, for example, have a 2-level B6 or a multi-level (e.g. 3-level) NPC (neutral point clamped), BSNPC (bipolar switch NPC), ANPC (active NPC), or FLC (flying capacitor) topology.

A method according to the disclosure for operating such an inverter comprises that, in a normal operating mode of the three-phase power distribution network and/or of a higher-level power supply network connected thereto, the phase outputs are connected to the respective phase conductor, and that, in the case of a fault in the three-phase power distribution network and/or in the higher-level power supply network connected thereto, the three-phase power distribution network will be disconnected from the higher-level power supply network, the first phase output will be disconnected from the first phase conductor and be connected to a neutral conductor of the three-phase power distribution network, that a neutral potential for the neutral conductor will be established via the first bridge branch, and that, after the network disconnection, the second bridge branch and the third bridge branch will be controlled in such a way that voltages between the second and the third phase outputs and the neutral conductor (N) in each case will have a different phase position in relation to one another.

In one embodiment the power distribution network is connected to the higher-level power supply network in a switchable manner via the network disconnector. The three-phase power distribution network typically comprises the three phase conductors and a neutral conductor. In the region of the network disconnector, the higher-level power supply network may also have four conductors, namely three phase conductors and one neutral conductor. The neutral conductor of the higher-level power supply network may thereby be connected to a ground conductor (PE) in the region of the network disconnector, for example, at a local network transformer. However, the higher-level power supply network does not necessarily need to have four conductors continuously. For example, it may also be designed in regions as a three-conductor network which in the relevant regions has the three phase conductors, but not the neutral conductor.

The situation that typically occurs in the event of a fault is that a fault occurs primarily in the higher-level power supply network which, due to the galvanic connection of the higher-level power supply network to the power distribution network, propagates via the network disconnector into the power distribution network. For this reason, a fault which is primarily present in the power supply network will also be present in the power distribution network as a result of the galvanic connection of the two networks due to the initially closed network disconnector. In contrast, via a disconnection of the power distribution network from the power supply network using the network disconnector, by opening the network disconnector, a propagation of the fault present in the higher-level power supply network to the power distribution network may be prevented. In a disconnected state of the two networks from one another, the power distribution network may continue to be operated in isolated mode, and its local loads may continue to be supplied in spite of a fault in the higher-level power supply network.

In one embodiment the term "network disconnection" refers to the disconnection of the power distribution network from the higher-level power supply network by means of the disconnector. Upon disconnection, the three phase conductors of the power distribution network are disconnected from the respective phase conductors of the higher-level power supply network that are associated with them. It is thereby not absolutely necessary that, in addition to the phase conductors, the neutral conductor of the power distribution network is also disconnected from the neutral conductor of the power supply network that is associated with it. Nevertheless, within the scope of the disclosure it is also possible, and in individual instances even advantageous, that, in addition to the three phase conductors, the neutral conductor of the power distribution network is disconnected from the respectively associated conductors of the higher-level power supply network. This type of disconnection is referred to in the following as an "all-pole disconnection."

By providing two phase conductors with respect to a neutral conductor, an isolated network may continue to be supplied with a power of up to ⅔ of the nominal power of the inverter. Single-phase consumers within a network installation are normally connected in a distributed manner to the different phase conductors. By two of three phase conductors being operated in the local isolated operating mode (emergency operating mode), more of the consumers remain operationally ready in the isolated network than, for example, in the case of the solution according to DE 10 2017 131 042 A1 in which only one single-phase isolated network is established. By the voltages between the second phase output and the neutral conductor on the one hand, and between the third phase output and the neutral conductor on the other hand having a different phase position, the voltage fluctuations in the intermediate circuit of the inverter are minimized, and, for example, are smaller than would be the case given the same phase position of the voltages relative to one another, for example, as described in publication DE 10 2017 131 042 A1.

In one embodiment of the inverter or of the method, the first bridge branch is controlled such that a central potential of a voltage of a DC intermediate circuit is established at the first phase output. This represents a simple-to-realize possibility of forming the neutral potential for the neutral conductor. This applies, for example, in the case of use of a 3-level bridge topology in which only the inner switches of the first bridge branch then need to be switched on in order to apply the central potential to the first phase output. However, the establishment of a central potential (which is temporally constant at least over a network period) assumes an intermediate circuit voltage that is greater than twice the amplitude of the voltages provided by the inverter on the two phase conductors. If this is not so, after the disconnection from the first phase conductor, the first bridge branch may alternatively be controlled such that a periodically modulated voltage curve is established as the neutral potential at the first phase output.

In one embodiment, upon disconnection of the power distribution network from the higher-level power supply network, the connections of the three phase conductors of both networks are disconnected from one another. A disconnection of the neutral conductor of the power distribution network from the corresponding neutral conductor of the power supply network is thereby not absolutely necessary. Instead, within the scope of the disclosure, an isolated operation of the power distribution network may also take place when the neutral conductors are or remain connected to one another. For this reason, it is possible for a corresponding network disconnector in this instance to have only three switching contacts. However, in a further embodiment of the inverter or of the method, it is provided to disconnect all poles of the three-phase power distribution network from the higher-level power supply network using a network disconnector in the event of a fault in the three-phase power distribution network and/or in the higher-level power supply network connected thereto. In the case of an all-pole disconnection, a disconnection of the neutral conductors of the power distribution network and of the higher-level power supply network also takes place. The network disconnector, which is normally arranged externally to the inverter, is thereby controlled accordingly by the inverter. For safety reasons, in the case of an all-pole disconnection it may be necessary to connect the neutral conductor of the power distribution network to a local ground potential (PE), for example, to a local ground anchor, since now a connection, present in the region of the higher-level power supply network, of neutral conductor to ground potential (PE) will be ineffective for the power distribution network due to the galvanic isolation of both networks. The connection of the neutral conductor of the power distribution network to the local ground potential (PE) may also take place via a suitable switching device which, for example, is controlled by the inverter.

In a further embodiment, the inverter is configured to control the second and third bridge branches after the network disconnection such that a phase shift of voltages between the second and third phase outputs and the neutral conductor in each case, relative to one another, differs from 120°.

In the case of a phase position of 120°, the DC voltage intermediate circuit is non-uniformly loaded, when viewed over the course of a network period. This leads to large voltage ripples at twice the network frequency in the DC voltage intermediate circuit and loads capacitors of the DC voltage intermediate circuit. In one embodiment this load is advantageously reduced in that the phase shift of 120° between the phase conductors and the neutral conductor in each case is altered to a value at which the DC voltage intermediate circuit is loaded more uniformly over the network period.

In one embodiment, a transition operating mode is provided in which the second and third bridge branches are controlled in such a way that, after the network disconnection, a voltage with a phase shift of 120° is initially output at the second and third phase outputs, and the phase shift between the second and third phase outputs is subsequently changed to the value deviating from 120°. In one embodiment the transition operating mode lasts a few network periods, for example, fewer than 5 network periods, in order to keep the loading of the intermediate circuit capacitors as low as possible.

In further embodiments of the method, a phase shift between the respective voltages provided between the neutral conductor and the second and third phase outputs is established depending on the topology of the bridge branches.

In one embodiment, in the case of an inverter with a 3-level topology of the bridge branches, the phase shift which is established after the network disconnection will be approximately 180°. The precise value of the phase shift may be regulated via a control loop in such a way that a magnitude of voltage ripples at twice the network frequency is minimized in a DC voltage intermediate circuit of the inverter.

In one embodiment, in the case of an inverter with a 2-level topology of the bridge branches, a phase shift of at least 90° and less than 120° is established after the network disconnection. The phase shift is, for example, approximately 90°, since minimal voltage ripples are observed in this case. However, the current will increase at the first phase output if the phase shift is reduced from 120° in the direction of 90°. In one embodiment, a maximum current is measured at the first phase output, and the phase shift is reduced toward 90° if the maximum current is below a predetermined threshold value and increases in the direction of 120° if the maximum current is above or at the predetermined threshold value. In one embodiment, a best possible value of the phase shift with regard to the loading of the intermediate circuit is selected dynamically depending on the current load situation in the isolated network, which is also accompanied by an acceptable current load for the first phase output.

BRIEF DESCRIPTION OF THE FIGURES

The disclosure is explained in more detail below using exemplary embodiments, with the aid of figures. The figures show.

DETAILED DESCRIPTION

Figure 1:
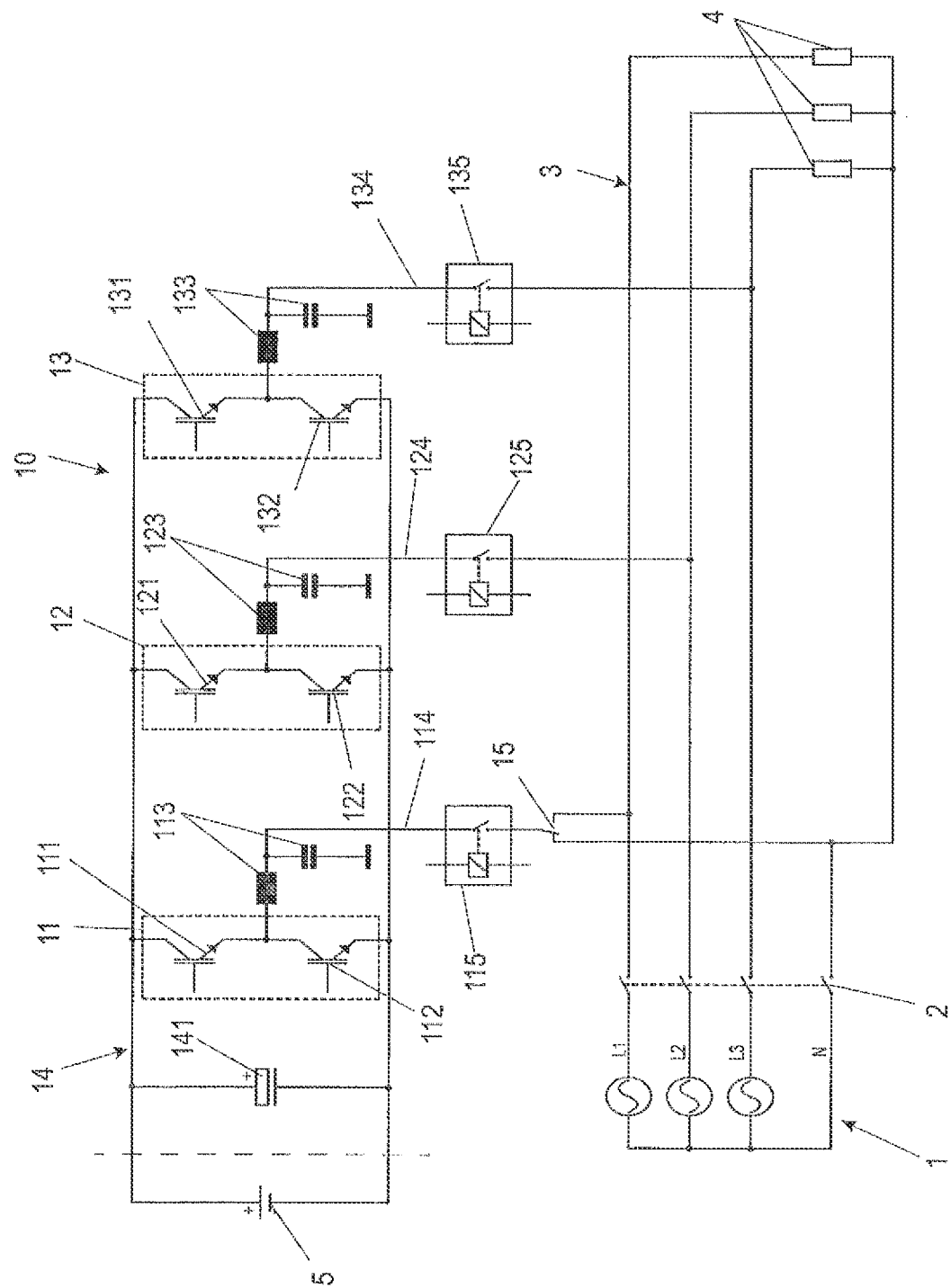
FIG. 1 a schematic representation of an inverter according to one embodiment of the disclosure, connected to a local power distribution network.

Reproduced in FIG. 1 is a schematic circuit diagram showing an arrangement with an inverter 10 in an example embodiment. The inverter 10 is coupled, in a manner still to be explained in more detail, to a local power distribution network 3, also referred to below as a network 3, which can be connected via a network disconnector 2 to a higher-level power supply network 1. By way of example, consumers 4 represented as resistors are connected to the local network 3.

Like the higher-level power supply network 1, the local network 3 is a three-phase network that comprises phase conductors L1, L2, and L3 as well as a neutral conductor N. A phase shift between the individual phase conductors L1, L2, or L3 amounts to 120°. In a normal operating mode, the local network 3 is coupled to the higher-level power supply network 1.

The inverter 10 comprises an inverter bridge with three bridge branches 11, 12, 13, which are fundamentally of similar design and are referred to, merely for the sake of differentiability, as first, second, and third bridge branches 11, 12, 13. Each of the bridge branches 11, 12, 13 comprises a series circuit of two semiconductor switching elements 111, 112 or 121, 122 or 131, 132. These series circuits are connected with their outer terminals to a DC voltage intermediate circuit 14, which is represented by an intermediate circuit capacitor 141 in the example embodiment in FIG. 1. It is understood that, in a realization of the illustrated circuit, the intermediate circuit capacitor 141 may comprise a plurality of individual capacitors connected in parallel and/or in series.

In the example presented, the connections of the DC voltage intermediate circuit 14 also form the input connections of the inverter 10 to which a DC voltage source 5 is connected here.

The DC voltage source 5 is represented, by way of example, by the circuitry symbol of a battery. In an implementation of the system shown in FIG. 1, it may be an interconnection of one or more rechargeable batteries and/or a photovoltaic (PV) generator, which for its part may comprise a plurality of PV cells, arranged in a plurality of PV modules. The PV modules may thereby also be connected in a series and/or parallel circuit in order to form the PV generator. Likewise by way of example, in the inverter 10 the direct current source 5 is directly connected to the DC voltage intermediate circuit 14. It is also conceivable in one embodiment to interpose a DC-DC converter in order to keep the DC voltage intermediate circuit 14 and the direct current source 5 at different voltage levels.

During operation of the inverter 10, the individual semiconductor switching elements 111, 112, 121, 122, 131, and 132 are controlled by a control circuit (not shown here), for example, in a pulse width modulation method (PWM method), in order to convert the supplied direct current. In the example shown, IGBTs (insulated gate bipolar transistors) are used as semiconductor switching elements 111, 112, 121, 122, 131, and 132. In alternative embodiments, bipolar transistors or MOSFETs (metal oxide semiconductor field effect transistors) may also be used.

In the case of the PWM method, suitable measured current and/or voltage values at the bridge branches 11, 12, 13 are required in order to correctly establish the switching times. Current measurements may, for example, take place with the aid of shunts, or else via Hall sensors which determine a current using a measured magnetic field. Voltage measurements may be performed with the aid of voltage dividers in one embodiment. The measured current and/or voltage values are evaluated in the control circuit. For reasons of clarity, representation of corresponding current and/or voltage measuring means has been dispensed with in FIG. 1.

The center taps of the bridge branches 11, 12, 13 are led out of the inverter 10 via one output filter 113, 123, 133 in each case as outputs. These outputs represent phase outputs 114, 124, and 134 of the inverter 10. The output filters 113, 123, 133 serve for a smoothing of the output voltage or the output current, so that these have an optimally sinusoidal time curve.

In principle, topologies may also be implemented in the inverter 10 other than the so-called 2-level B6 topology shown with in each case three bridge branches each having two semiconductor switching elements and center tap. An inverter may thus also be constructed in a three-level or multi-level topology such as "neutral point clamped" (NPC), "bipolar switch neutral point clamped" (BSNPC), "active neutral point clamped" (ANPC), or "flying capacitor" (FLC). These topologies normally require more semiconductor circuits per bridge branch than does the B6 topology, but may offer advantages with respect to their efficiency. An example embodiment of an inverter 10 with a 3-level NPC topology is reproduced in the example embodiment in FIG. 3.

Arranged between the phase outputs 114, 124, and 134 are switching elements or circuits 115, 125, and 135, via which the phase outputs 114, 124, 134 may be connected to the corresponding conductors L1, L2, or L3 of the network 3. As a special feature, the connection between the first phase output 114 and the phase conductor L1 is additionally routed via a switching circuit 15, the function of which will be explained in more detail below.

A connection of the three phase outputs 114, 124, 134 to the three phase conductors L1, L2, L3 represents a normal operating mode for the inverter 10, in which power provided by the direct current source 5 is fed in three phases into the local network 3 and serves to supply the consumers 4, or to feed into the power supply network 1.

Figure 2:
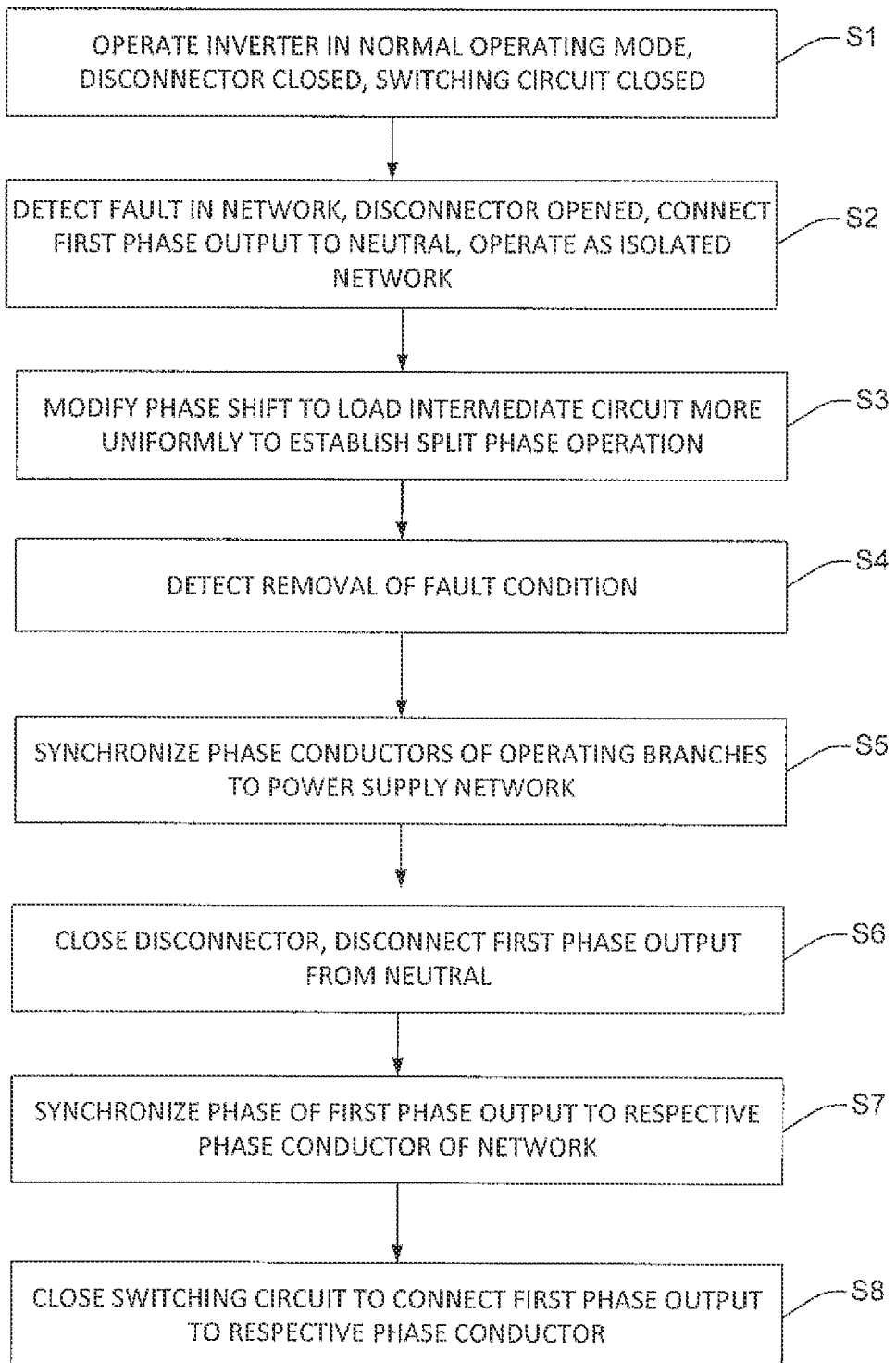
FIG. 2 a flow chart of an operating method for an inverter according to one embodiment of the disclosure.

Relating to FIG. 2, a flow chart is used to describe an operating method according to the application which may, for example, be executed with the inverter 10 shown in FIG. 1 in the illustrated connection with the network 3. The method is explained below by way of example with reference to FIG. 1.

The method starts at S1, in which the inverter 10, in the specified normal operating mode, feeds into the three-phase network 3 in a current-controlled or voltage-controlled manner. The network disconnector 2 is thereby closed and a connection to the power supply network 1 is established. The switching circuit 15 is in a switching position in which the first phase output 114 is connected to the phase conductor L1.

At S2, a fault in the local network 3 or in the higher-level power supply network 1 is detected, for example, by a network monitoring device (not shown in FIG. 1). In response to the network fault, the local network 3 is disconnected from the higher-level power supply network 1 by opening the network disconnector 2. The disconnection can, but does not necessarily need to, take place in all poles.

In order to be able to further supply power to as many of the consumers 4 as possible in the event of the network disconnection, the inverter 10 is used as an isolated inverter for the network 3. For this purpose, the switching circuit 15 is switched by the control circuit of the inverter 10, or by a higher-level control device, such that the first phase output 114 is connected to the neutral conductor N of the network 3. It may thereby be provided that a connection of the neutral conductor N of the local network 3 to a local ground potential PE, for example to a local ground anchor, is also established via the switching circuit 15 or via a separate switching circuit, which may be controlled by the inverter or by the higher-level control circuit. The first bridge branch 11 is thereby controlled in such a way that the potential at the neutral conductor N for the consumers 4 that are connected to the phase conductors L2 and L3 represents a neutral potential, whereby these consumers 4 may continue to be operated. A neutral potential represents, for example, a middle potential in the DC voltage intermediate circuit 14, wherein the use of the middle potential as a neutral potential requires a sufficiently high intermediate circuit voltage.

Specifically, a voltage in the intermediate circuit 14 which corresponds to twice the amplitude of the phase voltage to be provided is required for this purpose. In the event that such a high intermediate circuit voltage is not present in the normal operating mode, it may be provided to increase it accordingly after the network disconnection, which is possible if a DC-DC converter is arranged between the direct current source 5 and the DC voltage intermediate circuit 14. Alternatively, it may be provided to provide an auxiliary voltage with a curve which is itself modulated, i.e. a value which is not constant over time, as a neutral potential at the first phase output 114.

By providing two phase conductors with respect to one neutral conductor, the network 3 continues to be supplied as an isolated network with a power of up to ⅔ of the nominal power of the inverter 10. In order to be able to operate the isolated network, the inverter 10 is thereby no longer operated in a current-controlled or voltage-controlled manner, but rather in a voltage-setting manner, so that it functions as a network creator.

The phase position of the phase conductors L2 and L3 that continue to operate is initially adopted or maintained upon switching over to isolated operation; it thus has a phase difference of 120°. However, this phase position leads to large voltage ripples at twice the network frequency in the DC voltage intermediate circuit 14, and represents a load for the DC voltage intermediate circuit 14 that fluctuates strongly over a period of the AC voltage.

In order to reduce this load, at S3 the phase shift between the phase conductors L2 and L3 relative to the neutral conductor N is modified from 120° to a value at which the DC voltage intermediate circuit 14 is loaded more uniformly over the network period. In the case of an inverter with bridge branches in a 2-level topology (see FIG. 1), an optimally uniform load is achieved with a phase shift of 90°. In the case of an inverter with bridge branches in 3-level topologies (see FIG. 3), and in particular in the case of the same load on the phase conductors L2 and L3, this is normally a phase shift of 180°. The phase conductors L2 and L3, which continue to be supplied in the isolated network, are thus operated with respect to the neutral conductor in the manner of a so-called single-phase three-conductor network, also called a "split phase" network.

In the event that the two phase conductors L2 and L3 are not uniformly loaded—which is typically the case in practice—the optimum phase shift will not be at precisely 180°, but will rather deviate therefrom towards smaller or larger values. In one development of the method, it may be provided to determine the magnitude of the voltage ripple at twice the network frequency in the DC voltage intermediate circuit 14, and to adjust the angle of the phase shift in a control loop in such a way that the magnitude of the voltage ripple is minimized.

In order to keep the effects, for example, an aging of the intermediate circuit capacitor 141, of the loading of the DC voltage intermediate circuit 14 at the original phase relationship of 120° as small as possible, the changeover to "split phase" operation takes place as quickly as possible after the detection of the network fault, for example within a few network periods.

The "split phase" mode is maintained until it is detected at S4 that the network fault of the power supply network 1 has been rectified.

At S5, via corresponding control of the second and third bridge branches 12, 13, the phase conductors L2 and L3 are synchronized, with respect to their phase position, with the corresponding phase positions in the power supply network 1.

At S6, the network 3 is reconnected to the power supply network 1 by switching the network disconnector 2 on again. Furthermore, the first phase output 114 is disconnected from the neutral conductor N by opening the switching element 115.

In a subsequent act S7, the first phase output 114 is then synchronized to the phase position of the phase conductor L1 of the power supply network 1.

At a final act S8, the switching circuit 15 is then switched over again such that the first phase output 114 is connected to the phase conductor L1 after the switching circuit 115 has subsequently been switched on again. The arrangement is thus back in the normal operating mode which was also present in act S1.

Figure 3:
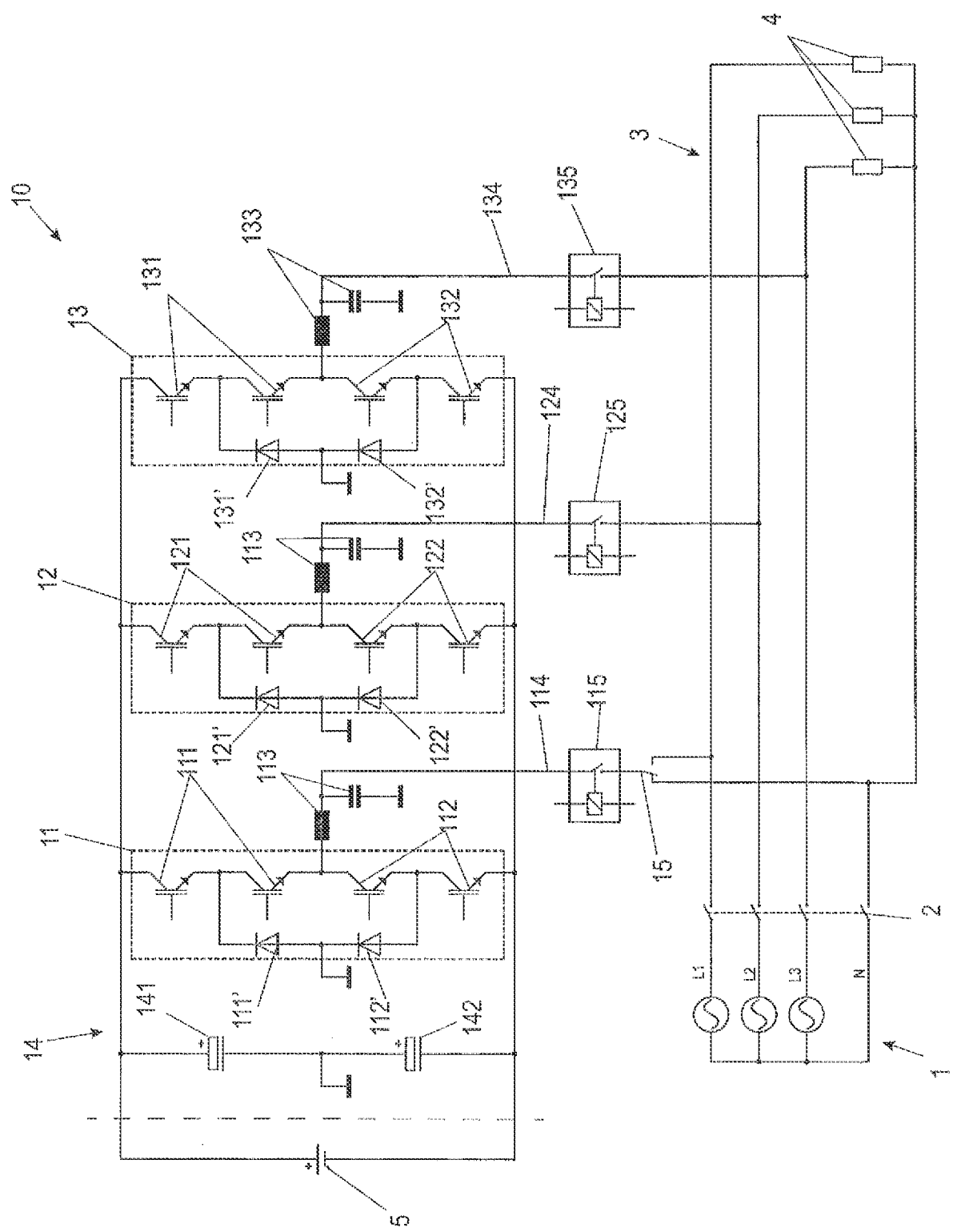
FIG. 3 a schematic example embodiment of an inverter in a second embodiment of the disclosure, connected to a local power supply network.

FIG. 3 shows, in a manner comparable to FIG. 1, a further example embodiment of an arrangement made up of an inverter 10, which is connected to a local network 3, which is coupled via a network disconnector 2 to a power supply network 1. Identical reference signs in this figure denote identical or identically acting elements as in FIG. 1. The arrangement of FIG. 3 differs from the arrangement according to FIG. 1 only in the topology of the inverter 10; reference is hereby explicitly made to the description of FIG. 1.

In the case of the inverter 10 according to FIG. 3, the three bridge branches 11, 12, 13 are constructed as 3-level NPC (neutral point clamped) bridge branches. Instead of a series connection of the two semiconductor switching elements 111, 112 (or 121, 122 and 131, 132), two semiconductor switching elements 111 (or 121, 131) and two semiconductor switching elements 112 (or 122, 132) are here respectively connected in series, wherein a center tap between these two semiconductor switching elements is in each case clamped to a neutral potential via a further semiconductor switching element 111', 112' (or 121', 122' and 131', 132'). These further semiconductor switching elements 111', 112' (or 121', 122' and 131', 132') are formed by diodes in the example shown.

As a further difference from the first example embodiment of FIG. 1, the DC voltage intermediate circuit 14 is constructed as a split intermediate circuit with two intermediate circuit capacitors 141, 142 connected in series. A center tap between the two intermediate circuit capacitors 141, 142 forms the neutral potential.

Also in the case of this arrangement, the operating method described in connection with FIG. 2 may advantageously be executed, in which operating method, after the occurrence of a network fault, voltage with respect to the neutral conductor N is applied to the two phase conductors L2 and L3 by the inverter 10, wherein the neutral conductor N is kept at a neutral potential by the first bridge branch 11. It is advantageous in the case of a 3-level inverter that a middle potential as a neutral potential may be generated on the neutral conductor N simply by switching on the inner of the switching elements 111 and 112 of the first bridge branch 11. In this example embodiment, the subsequent setting of a phase position of approximately 180° leads to smaller voltage ripples at twice the network frequency, and thus to a lower load on the intermediate circuit capacitors 141, 142. Due to the split design of the intermediate circuit 14, the inverter has a dynamic and stable control behavior.

What is claimed is:

1. An inverter, comprising
a first bridge branch comprising a first phase output,
a second bridge branch comprising a second phase output,
a third bridge branch comprising a third phase output,
wherein the first, second and third phase outputs of the first, second and third bridge branches are each configured to be connected to a respective first, second and third phase conductor of a three-phase power distribution network,
wherein the inverter is configured:
in a normal operating mode of the three-phase power distribution network and/or of a higher-level power supply network connected thereto, to connect the first, second and third phase outputs to the respective first, second and third phase conductor, and
in the case of a fault in the three-phase power distribution network and/or in the higher-level power supply network connected thereto, to disconnect the three-phase power distribution network from the higher-level power supply network using a network disconnector, to disconnect the first phase output from the first phase conductor using a switching unit and to connect the first phase output to a neutral conductor of the three-phase power distribution network, to establish a neutral potential for the neutral conductor via the first bridge branch, and to control the second bridge branch and the third bridge branch after the network disconnection so that voltages between the second and third phase outputs and the neutral conductor in each case have a different phase position in relation to one another.

2. The inverter according to claim 1, further comprising a DC voltage intermediate circuit coupled in parallel with each of the first, second and third bridge branches, wherein the inverter is further configured to control the first bridge branch such that a middle potential of a voltage of the DC voltage intermediate circuit is established at the first phase output.

3. The inverter according to claim 1, wherein the three-phase power distribution network has the higher-level power supply network connected thereto, wherein the inverter is further configured to disconnect all poles of the three-phase power distribution network from the higher-level power supply network using the network disconnector in the event of a fault in the three-phase power distribution network and/or in the higher-level power supply network connected thereto.

4. The inverter according to claim 1, which is further configured to control the second and third bridge branches after the network disconnection such that a phase shift of voltages between the second and third phase outputs and the neutral conductor in each case, relative to one another, deviates from 120°.

5. The inverter according to claim 4, which is further configured to control, in a transition operating mode, the second and third bridge branches such that, after the network disconnection, voltages with a phase shift of 120° relative to one another are initially output at the second and third phase outputs, and the phase shift of the voltages between the second and third phase outputs and the neutral conductor in each case is subsequently changed to a value deviating from 120°.

6. The inverter according to claim 5, wherein the transition operating mode lasts fewer than 5 network periods.

7. The inverter according to claim 1, wherein the first, second and third bridge branches comprise a 2-level B6 or 3-level NPC, BSNPC, ANPC, or FLC topology.

8. A method for operating an inverter comprising first, second and third bridge branches and respective first, second and third phase outputs that each configured to connect selectively to a respective first, second and third phase conductor of a three-phase power distribution network comprising:

in a normal operating mode of the three-phase power distribution network and/or of a higher-level power supply network connected thereto, connecting the first, second and third phase outputs to the respective first, second and third phase conductors, and in the case of a fault in the three-phase power distribution network and/or in the higher-level power supply network connected thereto, disconnecting the three-phase power distribution network from the higher-level power supply network, disconnecting the first phase output from the first phase conductor and connecting it to a neutral conductor of the three-phase power distribution network, establishing a neutral potential for the neutral conductor via the first bridge branch, and controlling the second bridge branch and the third bridge branch after the network disconnection such that voltages between the second and third phase outputs and the neutral conductor in each case have a different phase position with respect to one another.

9. The method according to claim 8, further comprising controlling the first bridge branch after the disconnection from the first phase conductor, such that a middle potential of a voltage of a DC voltage intermediate circuit, that is coupled in parallel with the first, second and third bridge branches, is established as a neutral potential at the first phase output.

10. The method according to claim 8, further comprising controlling the first bridge branch after the disconnection from the first phase conductor such that a periodically modulated voltage curve is established as a neutral potential at the first phase output.

11. The method according to claim 8, further comprising, after a detection of the fault in the three-phase power distribution network and/or in the higher-level power supply network connected thereto, disconnecting the three-phase power distribution network at all poles from the higher-level power supply network.

12. The method according to claim 8, wherein the inverter comprises a 3-level topology of the first, second and third bridge branches, the method further comprising, after the network disconnection, controlling the second and third bridge branches such that voltages phase-shifted by approximately 180° relative to one another are provided between the neutral conductor in each case and the second and third phase outputs.

13. The method according to claim 12, further comprising regulating a value of the phase shift via a control loop such that a magnitude of voltage ripples at twice a network frequency of the three-phase power distribution network is minimized in a DC voltage intermediate circuit of the inverter.

14. The method according to claim 8, wherein the inverter comprises a 2-level topology of the bridge branches, the method further comprising, after the network disconnection, controlling the second and third bridge branches such that voltages phase-shifted by at least 90° and less than 120° are provided between the neutral conductor in each case and the second and third phase outputs.

15. The method according to claim 14, wherein the phase shift is 90°.

16. The method according to claim 14, further comprising measuring a maximum current at the first phase output, and reducing the phase shift toward 90° when the maximum current is below a predetermined threshold value and increasing the phase shift toward 120° when the maximum current is above or at the predetermined threshold value.

* * * * *